(12) United States Patent
Saito et al.

(10) Patent No.: US 9,634,392 B2
(45) Date of Patent: Apr. 25, 2017

(54) MULTI-COIL MODULE AND ELECTRONIC DEVICE

(71) Applicant: DEXERIALS CORPORATION, Shinagawa-ku, Tokyo (JP)

(72) Inventors: Norio Saito, Tochigi (JP); Hiroyuki Ryoson, Tochigi (JP); Katsuhisa Orihara, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 48 days.

(21) Appl. No.: 14/443,171

(22) PCT Filed: Oct. 24, 2013

(86) PCT No.: PCT/JP2013/078775
§ 371 (c)(1),
(2) Date: May 15, 2015

(87) PCT Pub. No.: WO2014/077098
PCT Pub. Date: May 22, 2014

(65) Prior Publication Data
US 2015/0280322 A1    Oct. 1, 2015

(30) Foreign Application Priority Data
Nov. 15, 2012  (JP) .................................. 2012-251543

(51) Int. Cl.
*H01Q 7/06*     (2006.01)
*H01Q 21/28*    (2006.01)
(Continued)

(52) U.S. Cl.
CPC .............. *H01Q 7/06* (2013.01); *H01Q 1/2208* (2013.01); *H01Q 21/28* (2013.01); *H02J 5/005* (2013.01); *H02J 7/025* (2013.01); *H04B 5/0087* (2013.01)

(58) Field of Classification Search
CPC ...... H01Q 7/00; H01Q 1/2225; H01Q 1/2208; H01Q 1/36; H01Q 7/06; H01Q 38/14
(Continued)

(56) References Cited

U.S. PATENT DOCUMENTS

| 8,901,776 B2 * | 12/2014 | Urano | H01F 38/14 |
| | | | 307/104 |
| 2010/0181842 A1 * | 7/2010 | Suzuki | H02J 5/005 |
| | | | 307/104 |

(Continued)

FOREIGN PATENT DOCUMENTS

| JP | 2005-277607 A | 10/2005 |
| JP | 2008-035464 A | 2/2008 |

(Continued)

OTHER PUBLICATIONS

Jun. 16, 2016 Search Report issued in European Patent Application No. 13854467.1.

(Continued)

*Primary Examiner* — Linh Nguyen
(74) *Attorney, Agent, or Firm* — Oliff PLC

(57) ABSTRACT

The loss is reduced even when loop coils of a multi-coil module are overlaid with each other. The multi-coil module includes a first coil module, having a first magnetic sheet and a first loop coil provided on the first magnetic sheet and wound in a planar shape, and a second coil module, having a second magnetic sheet and a second loop coil provided on the second magnetic sheet and wound in a planar shape. The first coil module and the second coil module are stacked on each other, and at least an innermost coil pattern of the first loop coil and the second loop coil are overlaid with each other. The line width of the innermost coil pattern t of the first loop coil overlaid with the second loop coil is 1 mm or less.

9 Claims, 18 Drawing Sheets

(51) Int. Cl.
*H01Q 1/22* (2006.01)
*H02J 5/00* (2016.01)
*H02J 7/02* (2016.01)
*H04B 5/00* (2006.01)

(58) Field of Classification Search
USPC .................................................. 343/720, 788
See application file for complete search history.

(56) References Cited

U.S. PATENT DOCUMENTS

| | | | |
|---|---|---|---|
| 2011/0074535 A1 | 3/2011 | Banno | |
| 2011/0309792 A1* | 12/2011 | Mochida | H02J 7/025 320/108 |
| 2012/0161535 A1 | 6/2012 | Jung et al. | |
| 2014/0117927 A1* | 5/2014 | Chateau | H04B 5/0075 320/108 |
| 2014/0168019 A1* | 6/2014 | Hirobe | H01Q 1/38 343/720 |
| 2016/0001663 A1* | 1/2016 | Chae | B60L 1/006 307/9.1 |
| 2016/0013555 A1* | 1/2016 | Orihara | H01Q 1/243 343/702 |
| 2016/0104937 A1* | 4/2016 | Kumura | H01Q 1/2208 343/788 |

FOREIGN PATENT DOCUMENTS

| | | |
|---|---|---|
| JP | 2009-182902 A | 8/2009 |
| JP | 2012-151836 A | 8/2012 |
| JP | 5013019 B1 | 8/2012 |

OTHER PUBLICATIONS

Jan. 21, 2014 International Search Report issued in International Patent Application No. PCT/JP2013/078775.

\* cited by examiner

US 9,634,392 B2

MULTI-COIL MODULE AND ELECTRONIC DEVICE

TECHNICAL FIELD

The present invention relates to a multi-coil module having a plurality of coil modules, and more particularly, to a multi-coil module and an electronic device in which one loop coil and another loop coil are at least partially overlaid with each other. This application claims the benefit of priority from Japanese Patent Application No. 2012-251543, filed on Nov. 15, 2012 in Japan, which is incorporated herein by reference.

BACKGROUND ART

Modern wireless communication devices incorporate a plurality of RF antennas, such as a telephone communication antenna, a GPS antenna, a wireless LAN/Bluetooth (registered trademark) antenna, and a radio frequency identification (RFID). In addition to these antennas, it is becoming increasingly common that a loop coil for electrical power transmission is also incorporated with the advent of non-contact charging technology. Methods of electrical power transmission used in non-contact charging technology include an electromagnetic induction method, a radio reception method, a magnetic resonance method, and the like. These methods all utilize electromagnetic induction or magnetic resonance occurred between a primary coil and a secondary coil. For example, the Qi standard for non-contact charging and the Near Field Communication (NFC) standard for RFID utilize electromagnetic induction.

PRIOR ART DOCUMENT

Patent Document

Patent Document 1: Unexamined Japanese Patent Publication No. 2008-35464

SUMMARY OF THE INVENTION

Problems to be Solved by the Invention

It is likely in some cases that a near field communication system that utilizes electromagnetic induction may be incapable of establishing communication between the antenna module in a reader/writer and the antenna module in a transponder, which is driven by a current generated in response to a magnetic field transmitted from the reader/writer if the sizes of the antenna coils significantly differ from each other.

For example, when a mobile phone that serves as a reader/writer is held over a poster having an IC tag attached thereto to extract information (coupon, map, campaign information, and the like) of that poster, the antenna coil embedded in the IC tag is approximately 2-cm square in size, while the antenna coil embedded in the mobile phone has a larger size, which is approximately 4-cm square. More specifically, as far as an NFC antenna module is concerned, the outer diameter of an antenna coil embedded in a mobile phone or smart phone is 60 mm×50 mm, while the outer diameter of a compact antenna coil embedded in an IC tag or the like is approximately 20 mm×25 mm or so.

Note that the magnetic field transmitted from the antenna module in the mobile phone tends to be dense near its antenna coil, and to be coarse with the distance from the antenna coil. The magnetic field transmitted from the antenna module in the IC tag exhibits a similar characteristic. In addition, near field communication is performed while the antenna modules responsible for the communication are in nearly close contact with each other. Thus, there occurs no problem when the inner-outer diameter difference between the antenna coils responsible for the communication is small as shown in FIG. 16A, but on the other hand, if the inner-outer diameter difference between the antenna coils responsible for the communication is large as shown in FIG. 16B, then the magnetic flux F transmitted from one antenna coil may fail to reach the other antenna coil, and thus it is likely to be unable to induce inductive coupling.

Thus, there has also been proposed a technique in which the pitch and/or the line width of the antenna pattern of the antenna module in the mobile phone is increased to thereby reduce the inner diameter of the antenna coil so that the antenna pattern of the antenna module in the mobile phone comes closer to the antenna pattern of the antenna module in the IC tag.

Meanwhile, with the downsizing and high performance of electronic devices, space allotted for embedding a plurality of antennas as described above in an electronic device, such as a mobile terminal device, is becoming very small. Thus, there is a growing demand for downsizing and slimming an antenna module, and also for combining and integrating a plurality of coil modules in order to embed an RFID antenna coil and a charging coil for non-contact charging in the same space.

For example, a multi-coil module 100 shown in FIG. 17 includes an RFID antenna module 101 and a charging module 102 for non-contact charging, both of which are integrally stacked. The RFID antenna module 101 each includes a magnetic sheet 103 for converging the magnetic flux, and an antenna coil 104 having a spiral coil shape, formed by spirally winding a conductor wire. The antenna coil 104 formed in the shape of a spiral coils attached all over the surface of the magnetic sheet 103.

Similarly, the charging module 102 also includes a magnetic sheet 105 for converging the magnetic flux, and a charging coil 106 having a spiral coil shape, formed by spirally winding a conductor wire. The charging coil 106 formed in the shape of a spiral coil is attached all over the surface of the magnetic sheet 105. The multi-coil module 100 has the charging module 102 overlaid in an inner portion of the antenna coil 104 of the antenna module 101 to have an integrated structure.

In this case, if the pitch and/or the line width of the RFID antenna coil 104 is increased in the multi-coil module 100 described above to thereby reduce the inner diameter, then, as shown in FIG. 18, the RFID antenna coil 104 and the charging coil 106 for non-contact charging are overlaid with each other. Therefore, for example, when the charging coil 106 for non-contact charging is subjected to the magnetic flux, the RFID antenna coil 104 is also exposed to the magnetic field, which causes a loss due to the generation of an eddy current, and also reflects the magnetic flux by the eddy current. This decreases the magnetic flux that reaches the charging coil 106, thereby creating a need for taking measures, such as enlargement of the magnetic sheet. In addition, it is likely that the antenna coil 104 generates heat by the generation of eddy current, and this may apply a thermal shock to the multi-coil module 100 and/or to neighboring components.

Thus, it is an object of the present invention to provide a multi-coil module and an electronic device that provide good inductive coupling between loop coils even when these loop coils are overlaid with each other in the multi-coil module.

Means to Solve the Problem

To solve the problems described above, a multi-coil module according to the present invention includes: a first coil module having a first magnetic sheet, and a first loop coil provided on the first magnetic sheet and wound in a planar shape; and a second coil module having a second magnetic sheet, and a second loop coil provided on the second magnetic sheet and wound in a planar shape, wherein the first coil module and the second coil module are stacked on each other, and at least an innermost coil pattern of the first loop coil and the second loop coil are overlaid with each other, and a line width of the innermost coil pattern of the first loop coil overlaid with the second loop coil is 1 mm or less.

An electronic device according to the present invention is an electronic device that has a multi-coil module in a device housing. The multi-coil module includes a first coil module, having a first magnetic sheet and a first loop coil provided on the first magnetic sheet, and wound in a planar shape, and a second coil module, having a second magnetic sheet and a second loop coil provided on the second magnetic sheet, and wound in a planar shape. The first coil module and the second coil module are stacked on each other, and at least an innermost coil pattern of the first loop coil and the second loop coil are overlaid with each other. A line width of the innermost coil pattern of the first loop coil overlaid with the second loop coil is 1 mm or less.

A multi-coil module according to the present invention includes a first coil module, having a first magnetic sheet and a first loop coil provided on the first magnetic sheet, and wound in a planar shape, and a second coil module, having a second magnetic sheet and a second loop coil provided on the second magnetic sheet, and wound in a planar shape. The first coil module and the second coil module are stacked on each other, and at least an innermost coil pattern of the first loop coil and the second loop coil are overlaid with each other. A line width of the innermost coil pattern of the first loop coil overlaid with the second loop coil is less than a line width of a coil pattern located outside of the innermost coil pattern.

In an electronic device having a multi-coil module in a device housing according to the present invention, the multi-coil module includes a first coil module, having a first magnetic sheet and a first loop coil provided on the first magnetic sheet, and wound in a planar shape, and a second coil module, having a second magnetic sheet and a second loop coil provided on the second magnetic sheet, and wound in a planar shape. The first coil module and the second coil module are stacked on each e other, and at least an innermost coil pattern of the first loop coil and the second loop coil are overlaid with each other. A line width of the innermost coil pattern of the first loop coil overlaid with the second loop coil is less than a line width of a coil pattern located outside of the innermost coil pattern.

According to the present invention, since the line width of the innermost antenna pattern of the first loop coil overlaid with the second loop coil is 1 mm or less. This reduces the generation of eddy current in the innermost coil pattern overlaid with the second loop coil when the second loop coil is subjected to the magnetic flux. This reduces a loss due to the generation of eddy current, and also prevents a situation in which efficient charging cannot be achieved caused by reflection of the magnetic flux due to an eddy current in the innermost coil pattern, and a situation in which thermal shock is applied to neighboring components caused by heat generation in the innermost coil pattern due to the generation of eddy current.

BRIEF DESCRIPTION OF THE DRAWINGS

FIG. 5 shows the non-contact charging module in a transparent manner for the purpose of illustration.

FIG. 6 shows the non-contact charging module in a transparent manner for the purpose if illustration.

FIG. 7 shows the non-contact charging module in a transparent manner for the purpose of illustration.

FIG. 9 shows the non-contact charging module in a transparent manner for the purpose of illustration.

FIG. 11 shows the non-contact charging module in a transparent manner for the purpose of illustration.

FIG. 12 shows the non-contact charging module in a transparent manner for the purpose of illustration.

FIG. 16A shows a case where the inner-outer diameter difference is so small that communication can be established. FIG. 16B shows a case where the inner-outer diameter difference is so large that communication cannot be established.

DESCRIPTION OF THE EMBODIMENTS

A multi-coil module and an electronic device to which the present invention is applied will be described below in detail with reference to the accompanying drawings. Note that it is to be understood that the present invention is not necessarily limited to the embodiments described below, or rather various modifications may be made without departing from the spirit of the present invention. In addition, the drawings are schematic, and thus may different in the dimensional scale and the like from the actual one. Specific dimensions and the like should be determined referring to the description given below. Needless to say, different figures may include portions having a different dimensional relationship and/or a different ratio between the figures.

Figure 1:
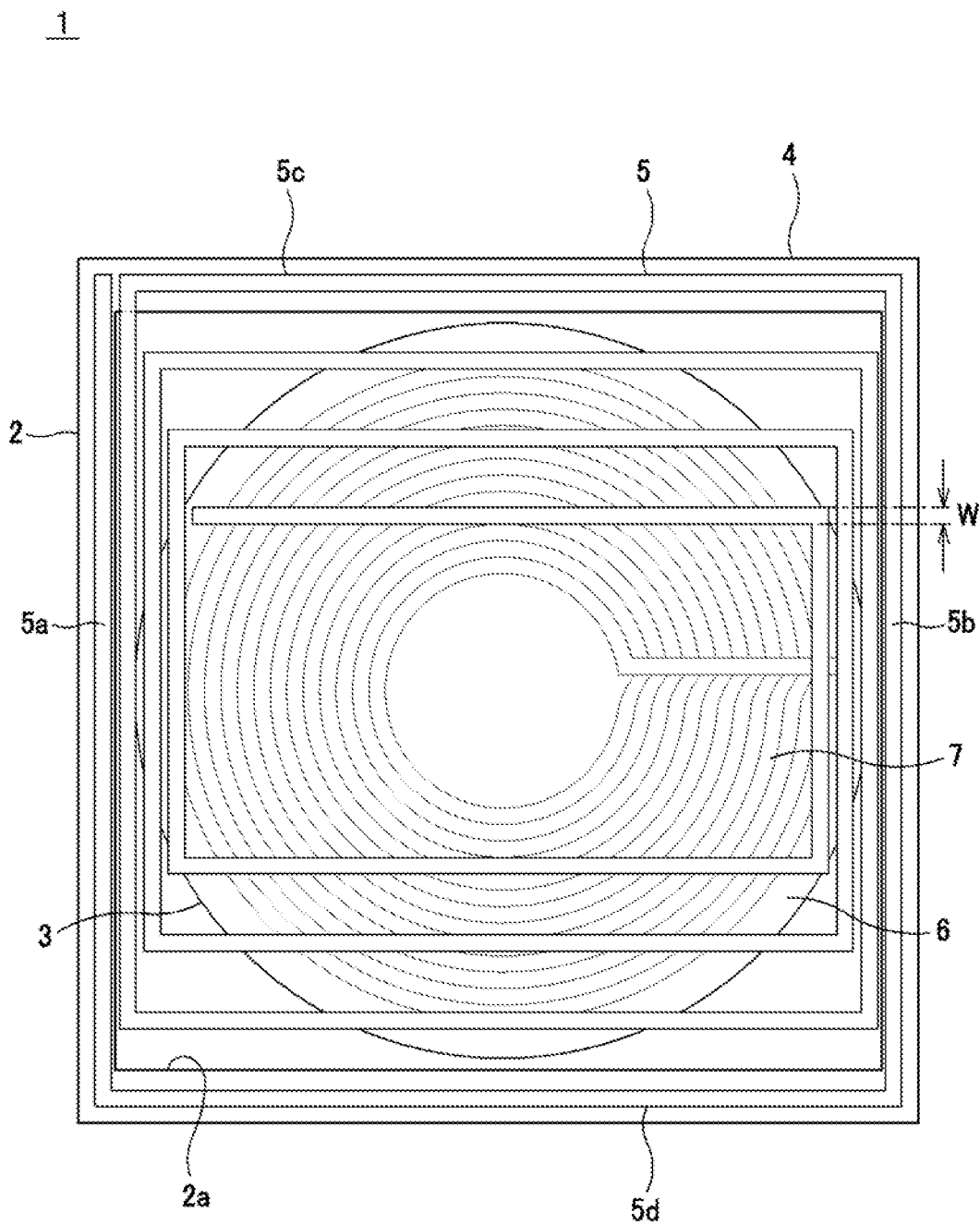
FIG. 1 is a diagram showing a multi-coil module to which the present invention is applied, and which shows a non-contact charging module in a transparent manner for the purpose of illustration.

A multi-coil module 1 to which the present invention is applied is intended to be embedded in a mobile-type electronic device, and implements both a near field communication function and a non-contact charging function. More specifically, as shown in FIG. 1, the multi-coil module 1 to which the present invention is applied includes an antenna module 2, which serves as a first coil module, and a non-contact charging module 3, which serves as a second coil module, provided inside the antenna module 2. The antenna module 2 is a module for RFID technology such as NFC, and includes a first magnetic sheet 4 formed in the shape of a sheet made of a magnetic material, and an antenna coil 5 having a spiral coil shape, provided on the first magnetic sheet 4, and wound in a planar shape . The non-contact charging module 3 is a module for non-contact charging such as Qi technology, and includes a second magnetic sheet 6 formed in the shape of a sheet made of a magnetic material, and a non-contact charging coil 7 having a spiral coil shape, provided on the second magnetic sheet 6, and wound in a planar shape.

[Antenna Module]

The first magnetic sheet 4 is made, for example, of a sintered material of NiZn-based ferrite. The first magnetic sheet 4 is formed using a process in which ferrite particles applied in a thin sheet form in advance are sintered under a high temperature environment to form a sheet, and the sheet is then die cutted into a predetermined shape. Alternatively, the first magnetic sheet 4 may be formed by applying, in advance, ferrite particles in the shape of a thin sheet to have the same shape as the final shape, and then performing sintering. Otherwise, the first magnetic sheet 4 may be formed into a predetermined shape by packing ferrite particles into a mold having a rectangular cross section, sintering the ferrite particles in a rectangular parallelepiped shape that is rectangular in planar view, and then slicing the sintered body into thin slices.

Note that the first magnetic sheet 4 may contain magnetic particles made of soft magnetic powder, and a resin as a bonding agent.

The magnetic particles may be those of an oxide magnetic material, such as ferrite; a crystalline or microcrystalline magnetic material, such as Fe-based, Co-based, Ni-based, Fe—Ni-based, Fe—Co-based, Fe—Al-based, Fe—Si-based, Fe—Si—Al-based, or Fe—Ni—Si—Al-based one; or an amorphous metallic magnetic material, such as Fe—Si—B-based, Fe—Si—B—C-based, Co—Si—B-based, Co—Zr-based, Co—Nb-based, or Co—Ta-based one.

Among others, NiZn-based ferrite described above is preferably used as the magnetic material for the first magnetic sheet 4 used in the antenna module 2 for RFID technology such as NFC.

A resin or the like cured by heat, ultraviolet irradiation, or other things may be used as the bonding agent. A known material may be used as the bonding agent, including, for example, a resin such as epoxy resin, phenolic resin, melamine resin, urea resin, or unsaturated polyester; or silicone rubber, urethane rubber, acrylic rubber, butyl rubber, ethylene propylene rubber, or the like. Note that the bonding agent may be one in which the resin or rubber described above is added by the appropriate amount of surface treating agent, such as a fire retardant, reaction control agent, cross-linking agent, or silane-coupling agent.

Note that the first magnetic sheet 4 is not necessarily limited to one made of a single magnetic material, but may be made of a mixture of two or more magnetic materials, or may be a stack of multiple layers. In addition, the first magnetic sheet 4 may be made of a substantially same magnetic material, may be made of a mixture of magnetic particles having a selected plurality of particle sizes and/or shapes, or may be a stack of multiple layers.

The antenna coil 5 is a conductive pattern, made of Cu foil or the like, formed in the shape of a spiral coil on a flexible substrate made of polyimide or other material. The antenna coil 5 has an outer diameter of a substantially rectangular shape, and is formed such that the patterns on each of one pair of sides 5a and 5b facing each other have a smaller pitch therebetween, while the patterns on each of the other pair of sides 5c and 5d perpendicular to the one pair of sides have a larger pitch therebetween. Note that in the description given below, the one pair of sides 5a and 5b facing each other are respectively referred to as left side 5a and right side 5b, while the other pair of sides 5c and 5d facing each other are respectively referred to as top side 5c and bottom side 5d.

Thus, out of the antenna patterns formed along the top side 5c and the bottom side 5d of the antenna coil 5, at least the innermost antenna pattern is overlaid with the non-contact charging coil 7 of the non-contact charging module 3 described herein later. Note that in the antenna patterns formed along the left side 5a and the right side 5b, the innermost antenna pattern is overlaid with the non-contact charging coil 7, but is not necessarily need to be overlaid therewith.

The magnetic sheet 4 has an outer diameter greater than or equal to the outer diameter of the antenna coil 5, and further includes an opening 2a. This opening 2a can accommodate the non-contact charging module 3 described herein later. Disposing the non-contact charging module 3 in the opening 2a allows slimming of the multi-coil module 1 by the amount equivalent to the thickness of the first magnetic sheet 4. Note that the antenna module 2 may have the magnetic sheet 4 which is overlaid only with antenna patterns formed along the left side 5a and the right side 5b. This enables the antenna module 2 to have a void region where the magnetic sheet 4 is not provided, between a pair of the magnetic sheets 4, which disposes the non-contact charging module 3 in this void region.

[Near Field Communication System]

Figure 2:
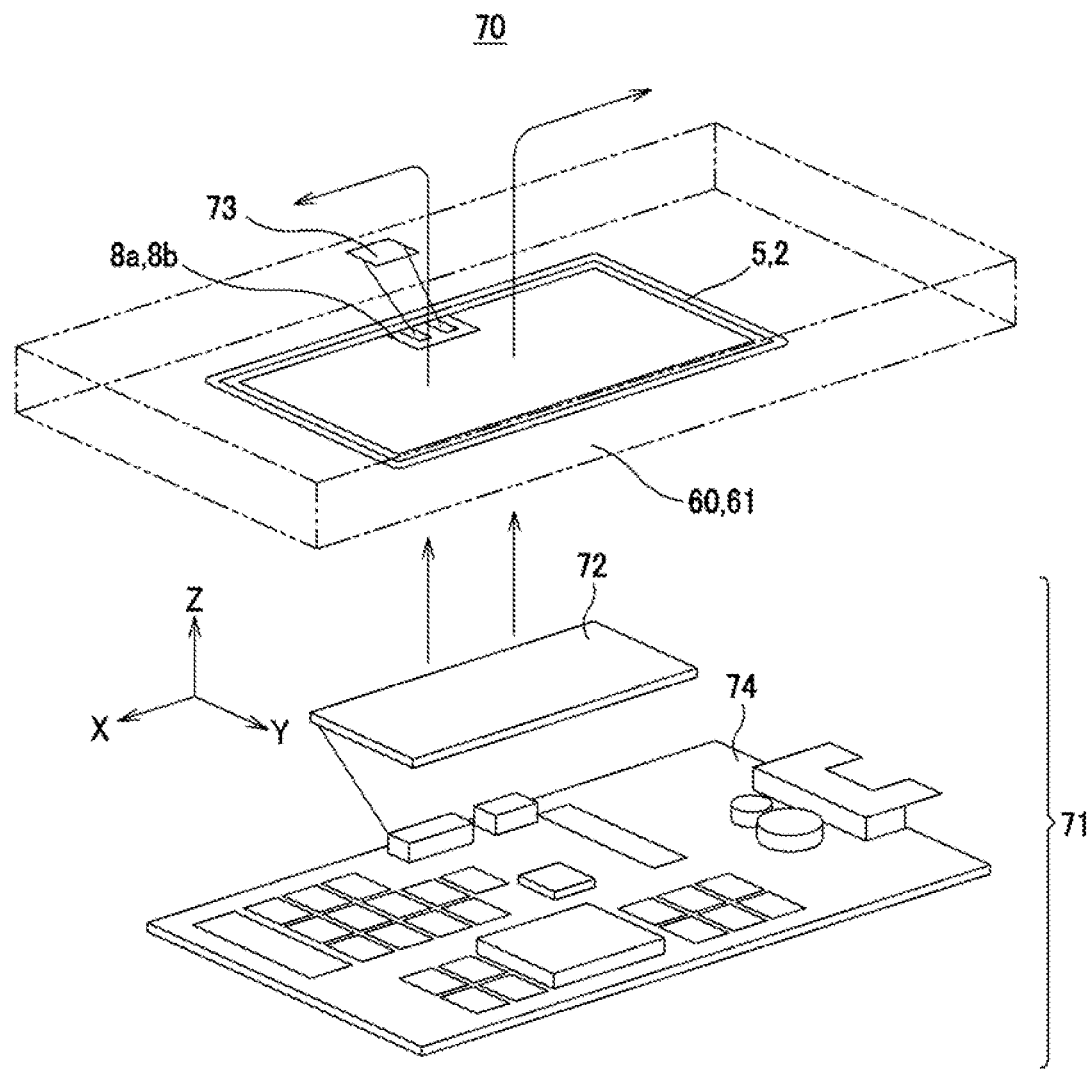
FIG. 2 is a conceptual diagram showing a wireless communication system.

A near field communication function of the antenna module 2 will next be described. As shown, for example, in FIG. 2, the multi-coil module 1 is embedded, for example, within a housing 61 of a mobile phone 60. The antenna module 2 is used as a wireless communication system 70 for RFID.

The wireless communication system 70 is a system in which a reader/writer 71 accesses a memory module 73 embedded in the mobile phone 60 together with the antenna module 2. It is assumed here that the antenna module 2 and the reader/writer 71 are arranged to face each other in an x-y plane of a three-dimensional orthogonal coordinate system xyz.

The reader/writer 71 functions as a transmitter that transmits a magnetic field in a z-axis direction with respect to the antenna coil 5 of the antenna module 2 facing the reader/writer 71 in the x-y plane. More specifically, the reader/writer 71 includes an antenna 72 that transmits a magnetic field toward the antenna coil 5, and a control substrate 74 that communicates with the memory module 73.

That is, the reader/writer 71 is provided with the control substrate 74 electrically connected to the antenna 72. This control substrate 74 includes a control circuit having one or more electronic components such as integrated circuit chips. This control circuit performs various processing based on data received from the memory module 73 through the antenna coil 5. For example, when data is transmitted to the memory module 73, the control circuit encodes the data, modulates the carrier wave of a predetermined frequency (e.g., 13.56 MHz) based on the encoded data, amplifies the modulated signal, and then drives the antenna 72 with the amplified modulated signal. When data is read from the memory module 73, the control circuit amplifies the modulated signal of the data received by the antenna 72, demodulates the modulated signal of the amplified data, and then decodes the demodulated data. Note that the control circuit uses an encoding and a modulation techniques used in a typical reader/writer, e.g., Manchester encoding and amplitude shift keying (ASK) modulation.

The antenna module 2 operates such that the antenna coil 5 receives the magnetic field transmitted from receiver/writer 71, the antenna coil 5 is inductively coupled to the reader/writer 71, and a signal is supplied to the memory module 73 that is a storage medium embedded in the mobile phone 60.

Upon receiving the magnetic field transmitted from the reader/writer 71, the antenna coil 5 is magnetically coupled to the reader/writer 71 by inductive coupling, receives a modulated electromagnetic wave, and then supplies the received signal to the memory module 73 through terminal portions 8a and 8b.

The memory module 73 is driven by a current flowing through the antenna coil 5, and communicates with the reader/writer 71. More specifically, the memory module 73 demodulates a received modulated signal, decodes the demodulated data, and writes the decoded data into an internal memory included in the memory module 73. In addition, the memory module 73 reads, from the internal memory, data to be transmitted to the reader/writer 71, encodes the read data, modulates the carrier wave based on the encoded data, and transmits the modulated wave to the reader/writer 71 through the antenna coil 5 that is magnetically coupled by inductive coupling.

[Reader/Writer Function]

The antenna module 2 also functions as a reader/writer. Thus, for example, by holding the mobile phone 60 over a poster or an electric appliance equipped with an IC tag, a user acquires information (coupon, map, campaign information, and the like) of that poster, or information (power consumption, various setting statuses, and the like) of that electric appliance, changes a setting of that electric appliance. In this instance, the antenna module 2 is supplied with power from a battery pack 81 incorporated in the mobile phone 60 to function as a reader/writer. Near field communication between the antenna module 2, as a reader/writer, and the IC tag is performed in the same ways as the communication between the reader/writer 71 and the antenna module 2 described above.

In this regard, an antenna coil provided in the IC tag is smaller in size than the antenna coil 5 of the antenna module 2 embedded in the mobile phone 60. For example, the outer diameter of the antenna coil 2 is 60 mm×50 mm, while the outer diameter of the compact antenna coil embedded in an IC tag and the like complying with the NFC standard is 20 mm×25 mm.

Figure 16A:
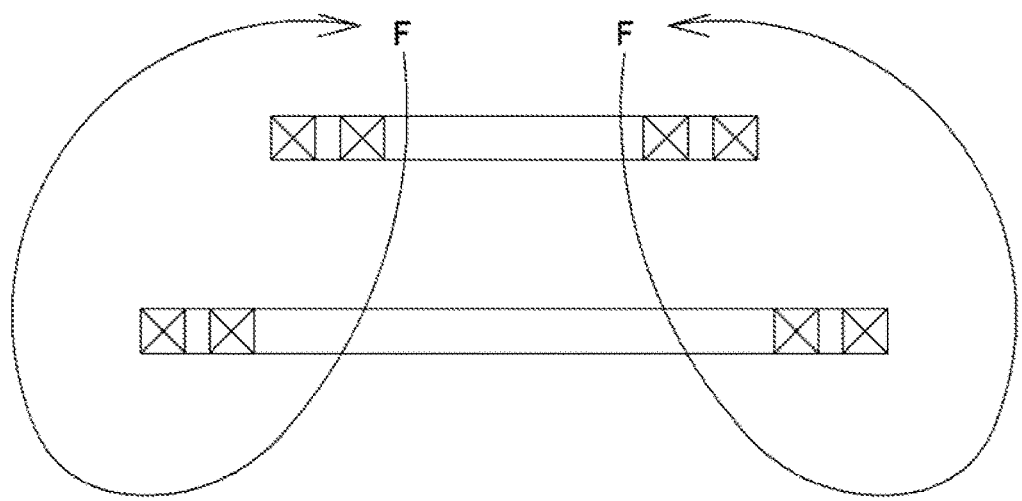
FIGS. 16A and 16B are diagrams for explaining communication performance in accordance with the difference between the inner and the outer diameters of the antenna coils.
Figure 16B:
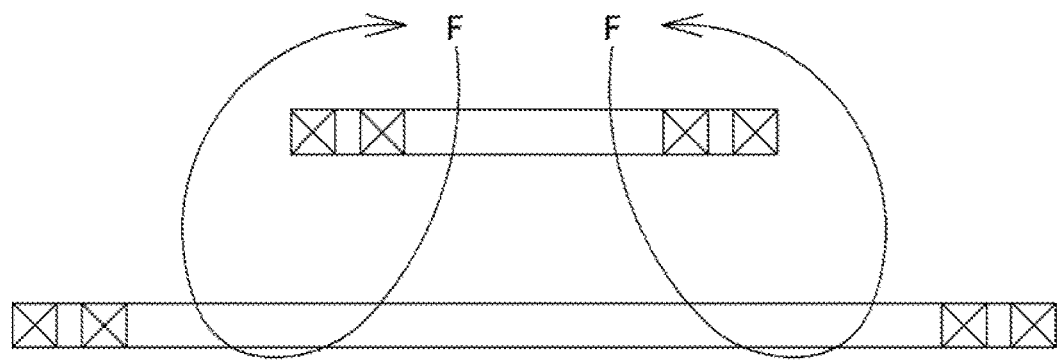
Figure 17:
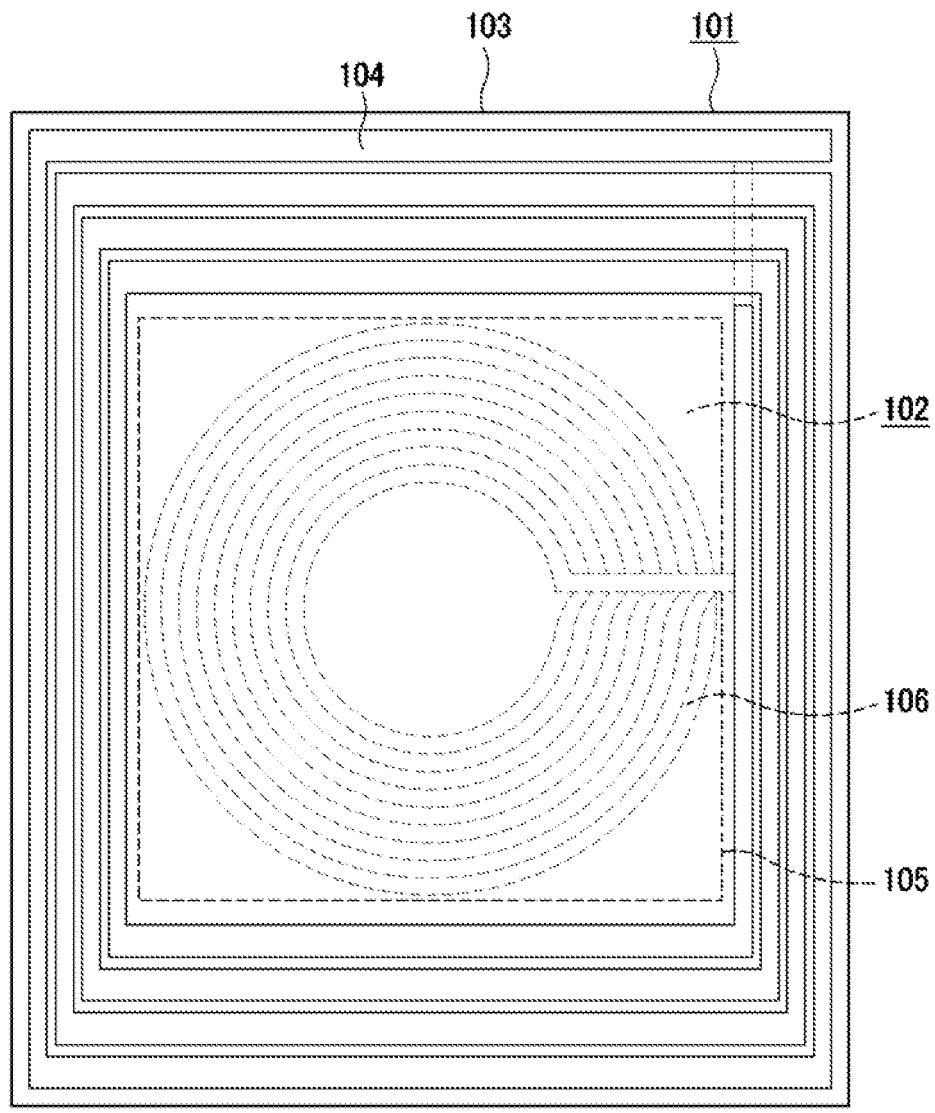
FIG. 17 is a diagram showing a multi-coil module in which an antenna module and a non-contact charging module are stacked on each other.
Figure 18:
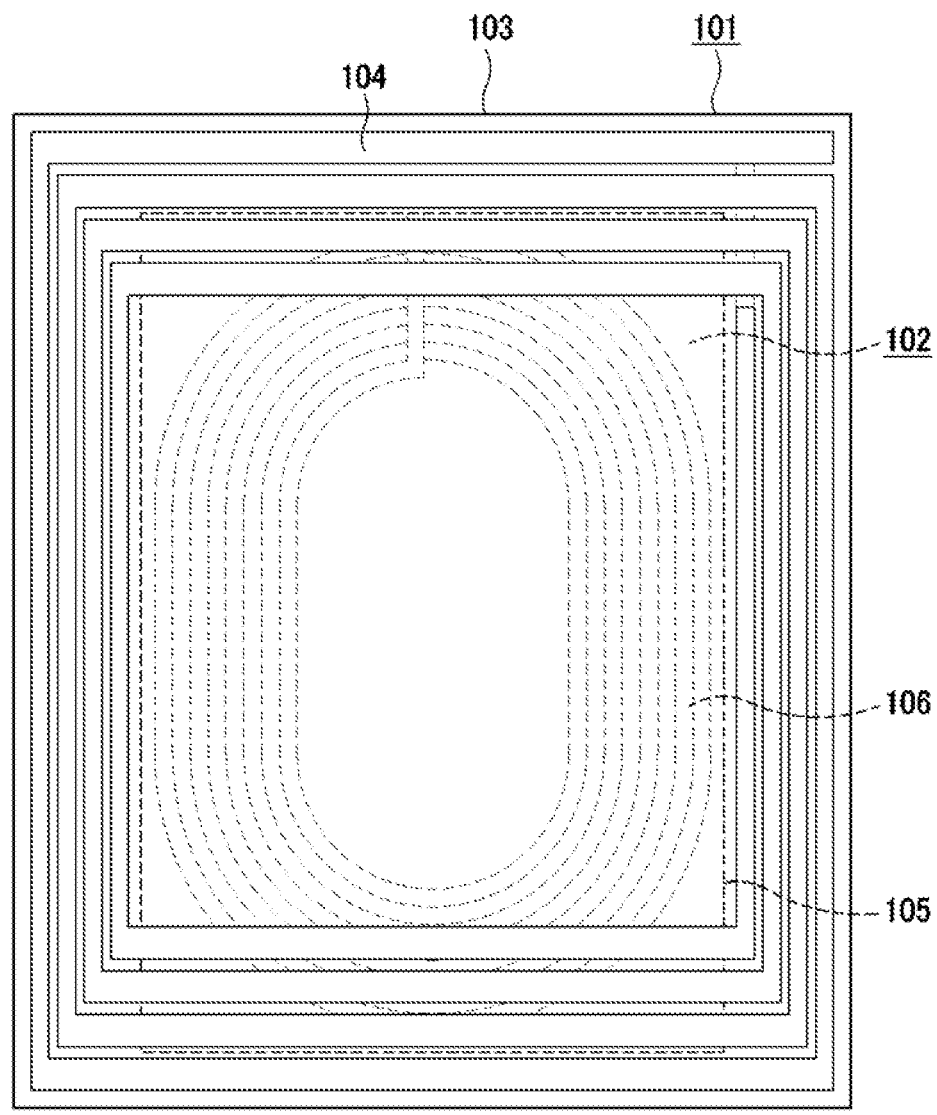
FIG. 18 is a diagram showing a multi-coil module in which an antenna module and a non-contact charging module are stacked on each other in such a manner that the inner diameter of the antenna coil is reduced so as to be overlaid with the non-contact charging coil.

As described above, the magnetic field transmitted from the antenna module in the mobile phone tends to be dense near its antenna coil, and to be coarse with the distance from the antenna coil. The magnetic field transmitted from the antenna module in the IC tag exhibits a similar characteristic. Near field communication is performed while the antenna module 2 and the antenna coil in the IC tag are in close contact with each other to a distance of several millimeters by holding the mobile phone 60 over the IC tag. Thus, it is likely that a large inner-outer diameter difference between the inner diameter of the antenna coil 5 and the outer diameter of the compact antenna coil in the IC tag responsible for communication may prevent the magnetic flux transmitted from one antenna module from reaching the other antenna module, thereby precluding inductive coupling (see FIGS. 16A and 16B).

Figure 3:
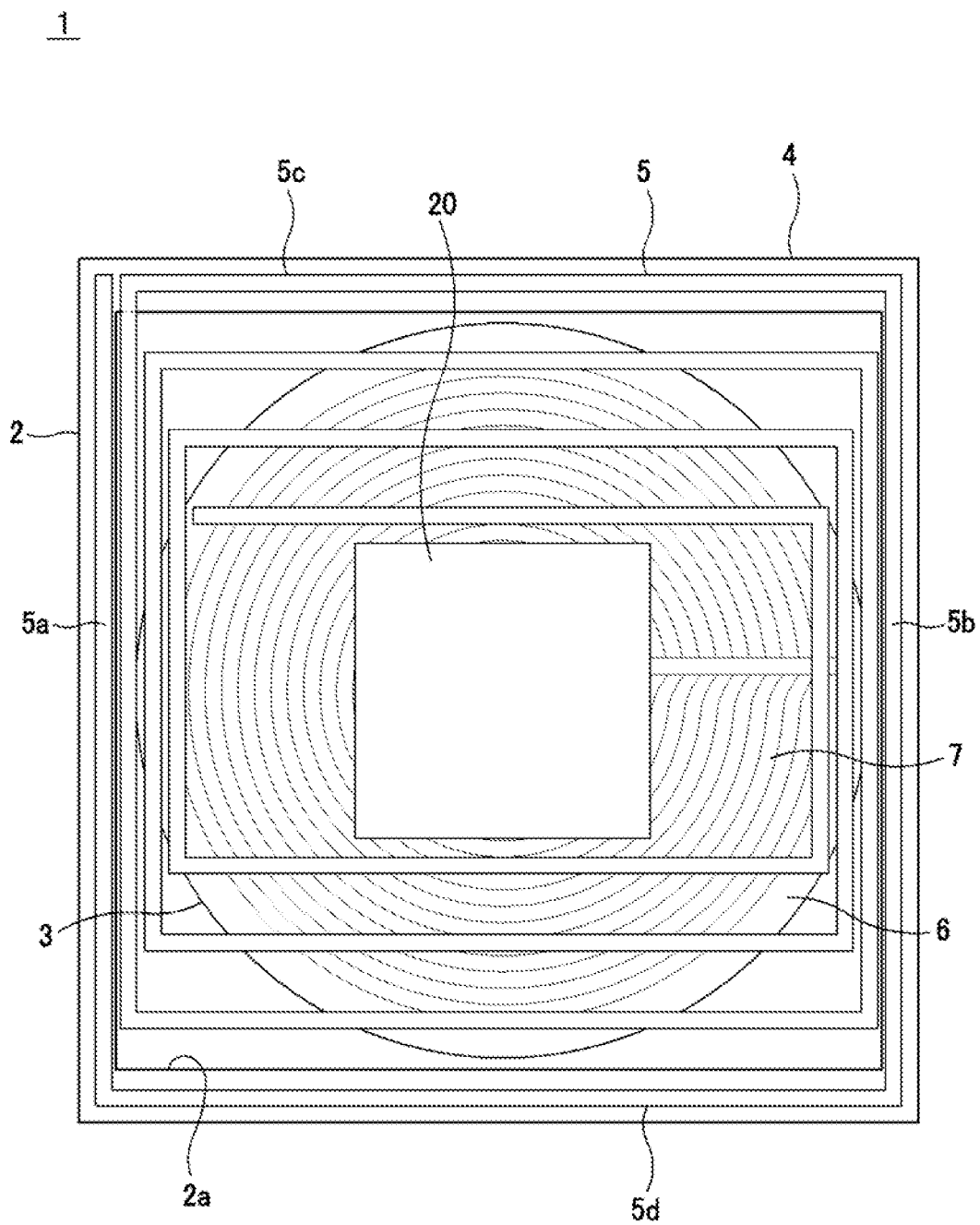
FIG. 3 is a plan view showing the difference between the inner diameter of the antenna coil and the outer diameter of the compact antenna coil embedded in an IC tag.
Figure 3:
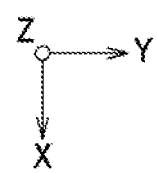

Thus, as shown in FIG. 3, the antenna module 2 in the mobile phone 60 is configured such that at least the radially innermost antenna pattern, out of the antenna patterns formed along the top side 5c and the bottom side 5d, is formed at a position nearer the center of the antenna coil 5 than the antenna patterns formed along the left side 5a and the right side 5b so that the inner diameter of the antenna coil 5 comes closer to the outer diameter of the compact antenna coil 20 of the antenna module in the IC tag. This allows the antenna coil 5 to be placed in proximity to the pattern of the antenna coil in the IC tag, and thus communication can also be established with the compact antenna coil 20.

[Width of Antenna Coil]

This also allows the antenna coil 5 to be configured such that at least the innermost antenna pattern, out of the antenna patterns formed along the top side 5c and the bottom side 5d is overlaid with the non-contact charging coil 7 of the non-contact charging module 3. At this moment, as shown in FIG. 1, the antenna coil 5 is configured such that the line width W of the innermost antenna pattern overlaid with the non-contact charging coil 7 is less than or equal to the line width of an antenna pattern located outside of the innermost antenna pattern. More specifically, the antenna coil 5 is configured to have the line width W of the innermost antenna pattern of 1 mm or less.

This suppresses the generation of eddy current in the innermost antenna pattern overlaid with the non-contact charging coil 7 when the non-contact charging coil 7 is subjected to the magnetic flux. This reduces a loss due to the generation of eddy current, and also prevents a situation in which efficient charging cannot be achieved caused by refection of the magnetic flux due to an eddy current in the innermost antenna pattern, and a situation in which thermal shock is applied to neighboring components caused by heat generation in the innermost antenna pattern due to the generation of eddy current.

For the eddy current to reduce, reduction in the line width of a coil to a value comparable with the skin depth is an effective way. This is because such a width results in a high resistance and impedes an eddy current from flowing when a current circulates through copper.

Figure 4:
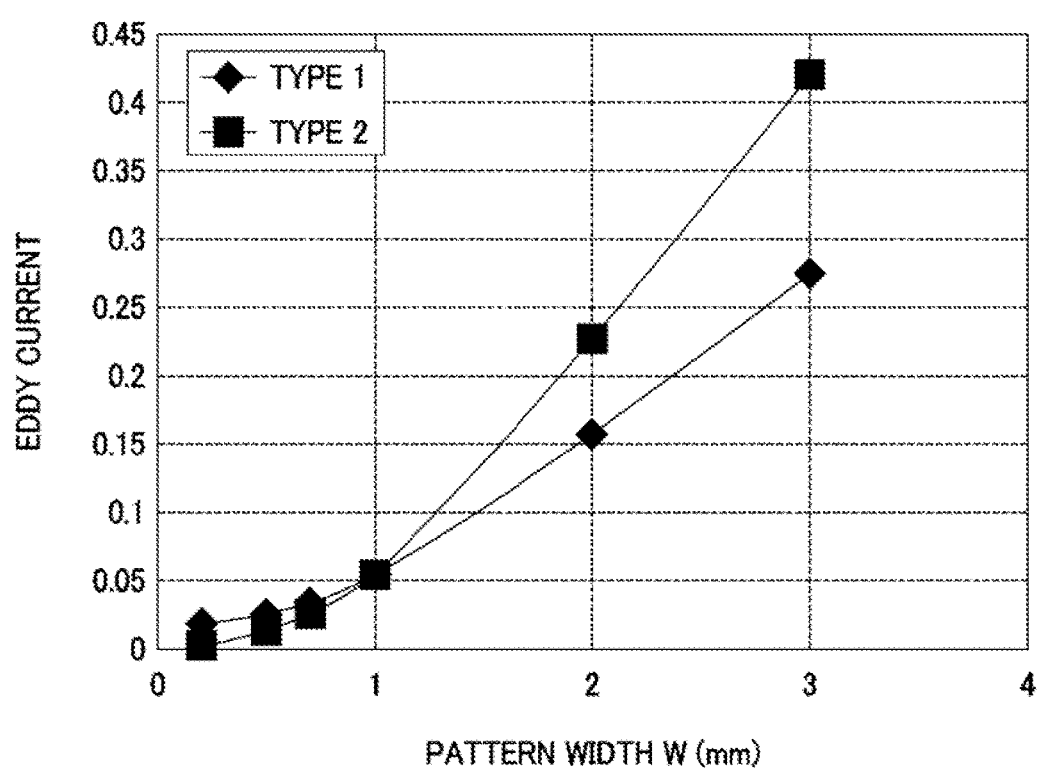
FIG. 4 is a graph showing a relationship between a line width of the antenna pattern and the value of an eddy current that flowing through the antenna pattern.

FIG. 4 is a graph showing a relationship between a line width of an antenna pattern along the top side 5*c* and the bottom side 5*d* of the antenna coil 5 and an eddy current flowing through the antenna pattern along the top and the bottom sides 5*c* and 5*d*. The specific conditions were obtained as follows: a magnetic field was generated in the transmission r coil at 120 kHz, and the eddy current generated in the antenna coil 5 was measured.

Figure 5:
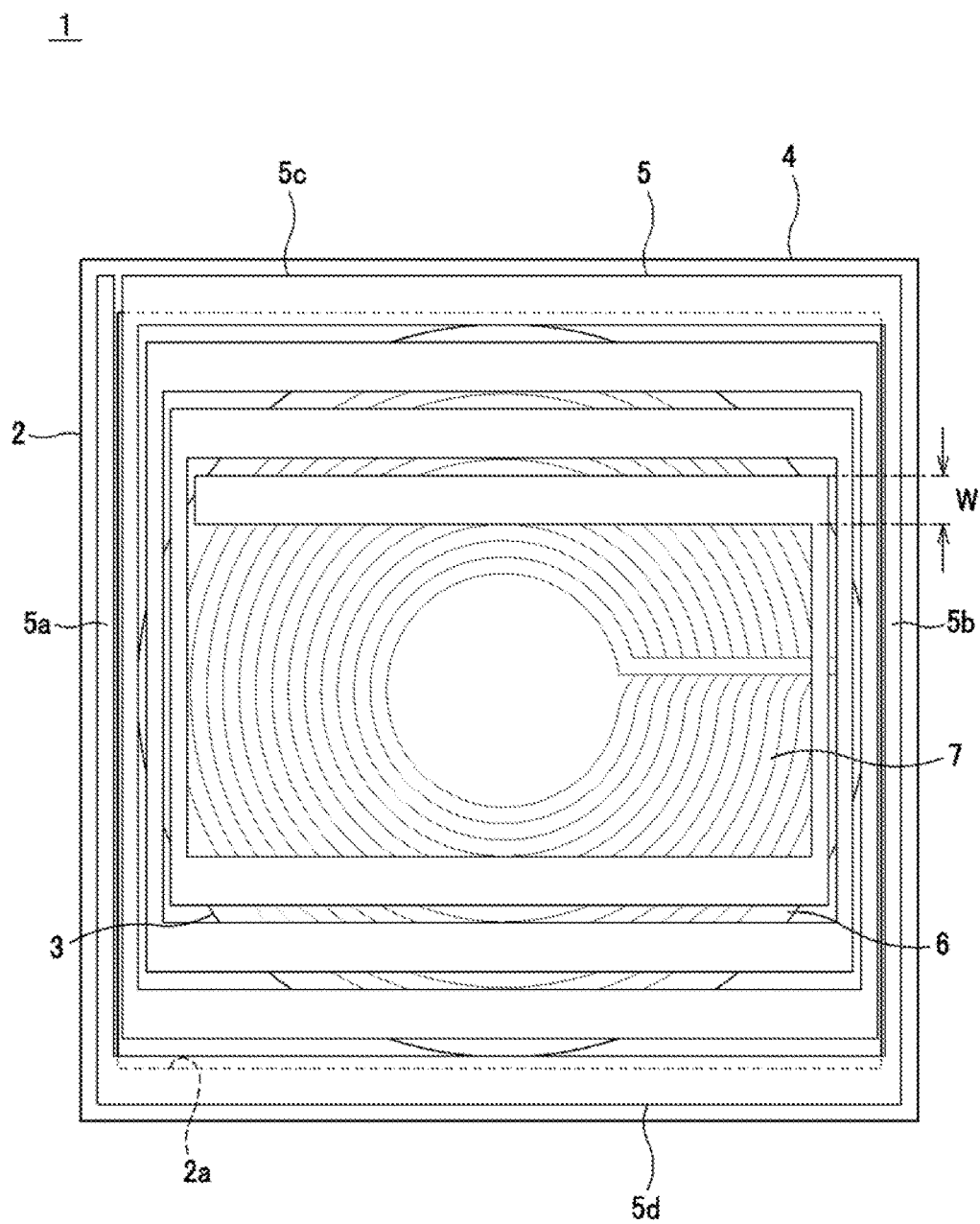
FIG. 5 is a plan view showing a multi-coil module in which the line widths and the pitches are fixed in the antenna patterns of the left and right sides, while the line widths and the pitches are variable in the antenna patterns of the top and bottom sides.
Figure 6:
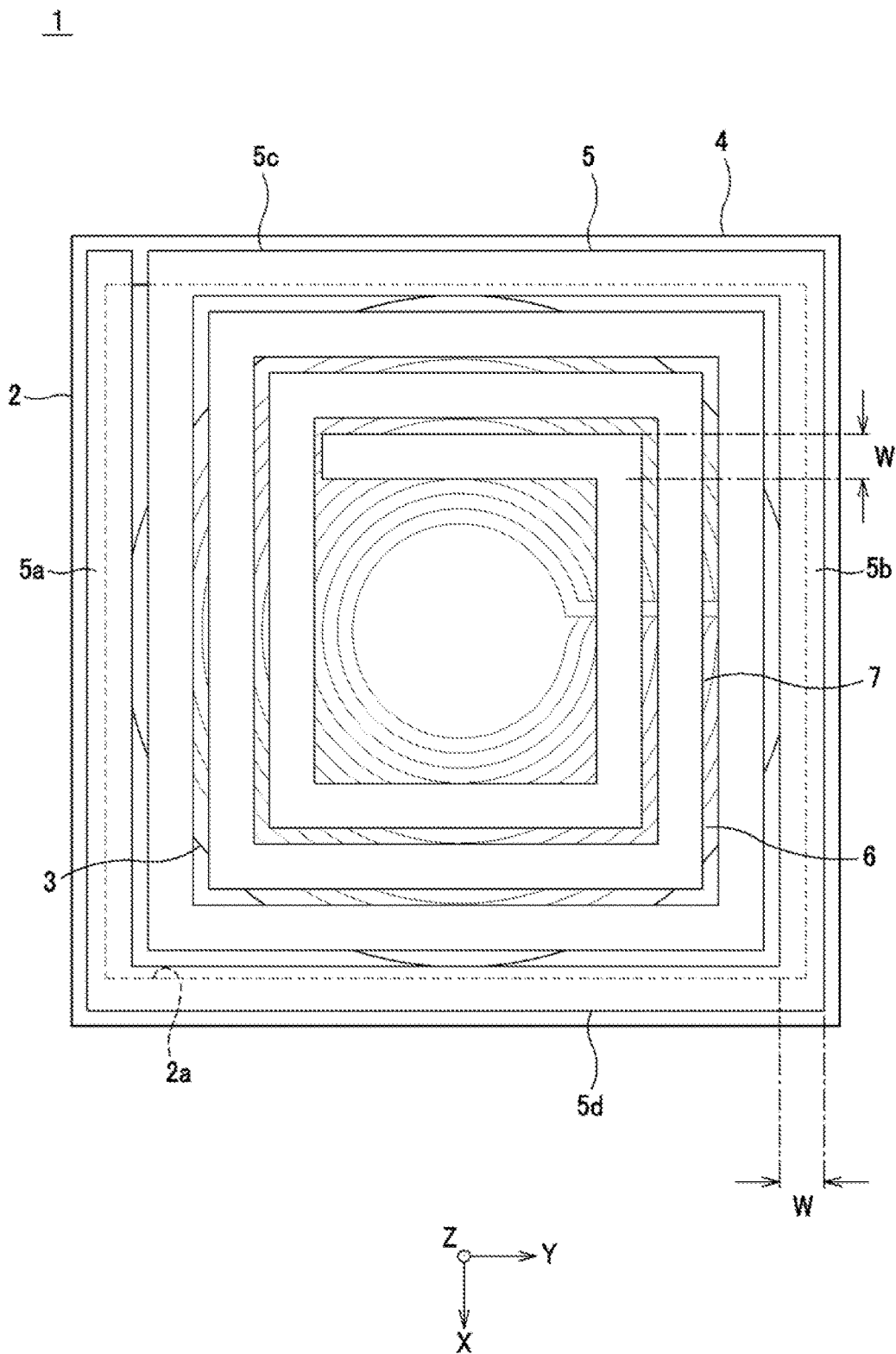
FIG. 6 is a plan view showing a multi-coil module when the line widths and the pitches of the antenna patterns of all the top, bottom, left, and right sides are equally variable.

Type 1 and type 2 have been prepared as the antenna coil 5. In type 1, as shown in FIG. 5, the line width of the antenna patterns along the left side 5*a* and the right side 5*b* is fixed at 1 mm, and the line width and the pitch of the antenna patterns along the top side Sc and the bottom side 5*d* overlaid with the non-contact charging coil 7 are changed. In type 2, as shown in FIG. 6, the antenna patterns are formed in the same line width over the whole length, and the line width and the pitch of the antenna patterns along all the sides 5*a* to 5*d* are equally changed. It can be seen from FIG. 4 that the narrower a line width of an antenna pattern is, the more the generation of eddy current is suppressed, and this effect becomes prominent t when the line width is 1 mm or less.

Alternatively, the antenna coil 5 may be configured such that only the line width of the radially innermost antenna pattern is small (1 mm or less). An investigation is made into a relationship between a line width and an eddy current of an antenna pattern located outside of the innermost antenna pattern when the innermost antenna pattern has a line width fixed at 1 mm. The specific conditions were obtained as follows: a magnetic field was generated in the transmission coil at 120 kHz, and the eddy current generated in the antenna coil 5 was measured.

Figure 7:
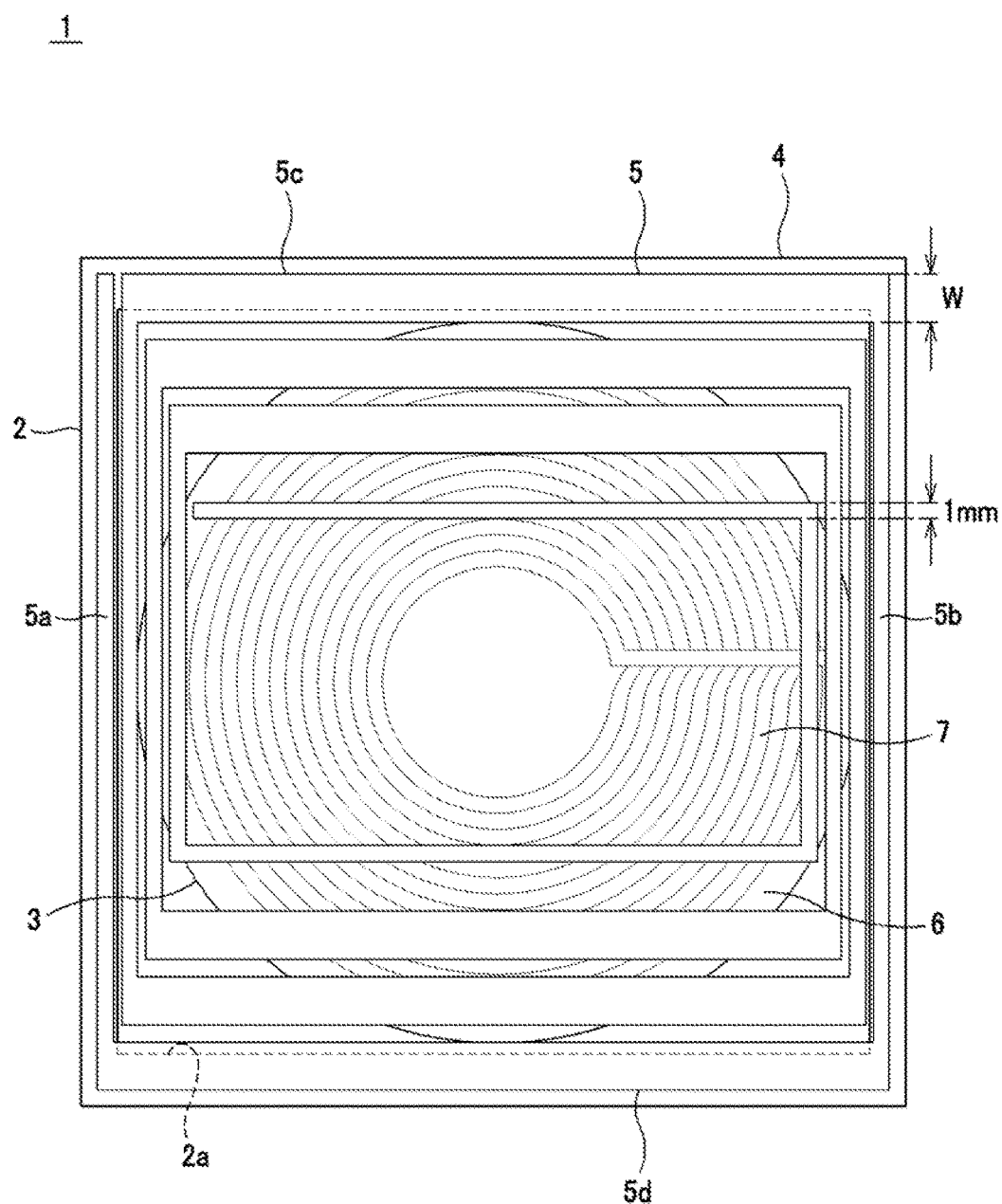
FIG. 7 is a plan view showing a multi-coil module in which the line width of the innermost antenna segment is fixed, and the line width of an outer antenna pattern is variable.

Type 3 has been prepared as the antenna coil. In type 3, as shown in FIG. 7, the line width of the antenna patterns along the left side 5*a* and the right side 5*b* is fixed at 1 mm, the line width of the innermost antenna pattern, out of the antenna patterns along the top side Sc and the bottom side 5*d* overlaid with the non-contact charging coil 7, is fixed at 1 mm, and the line width of the antenna patterns located outside of the innermost antenna pattern is changed. A comparison is made between this type 3 and type 1, in which the line width of the antenna patterns along the left side 5*a* and the right side 5*b* is fixed at 1 mm, and the line width and the pitch of the antenna patterns along the top side 5*c* and the bottom side 5*d* overlaid with the non-contact charging coil 7 are equally changed.

Figure 8:
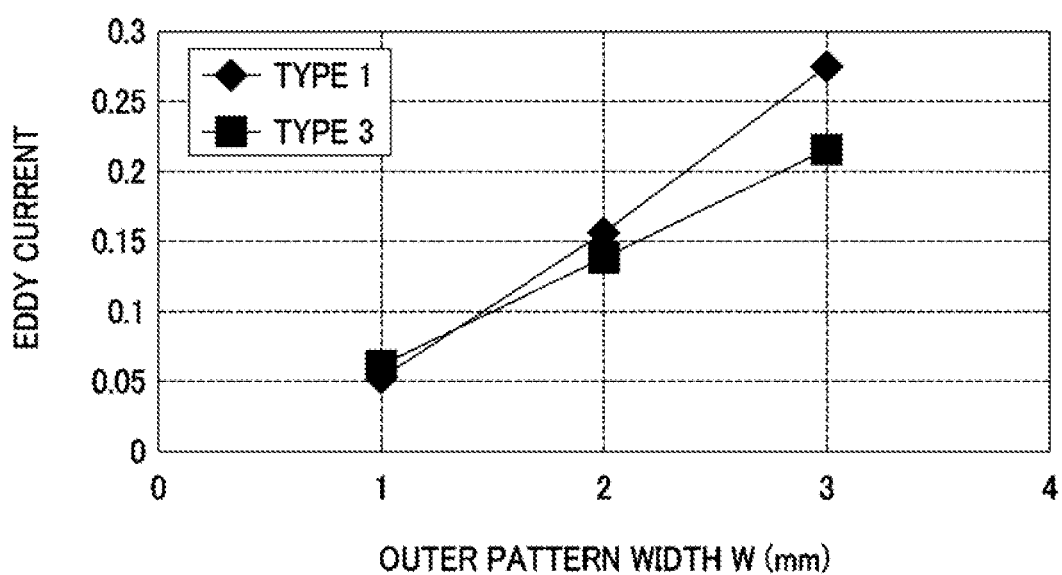
FIG. 8 is a graph showing a relationship between an eddy current and a pattern width of both an antenna module in which only the width of the innermost antenna pattern is fixed at 1 mm, and the widths of the outer pattern patterns are variable, and an antenna module in which the widths of the antenna patterns are equally variable across the entire diameter.

As shown in FIG. 8, type 3, in which the line width of the innermost antenna pattern is fixed at 1 mm, and the line width of the outer antenna patterns is changed, exerts an equivalent effect in reduction in an eddy current, relative to type 1, in which the line width of the antenna patterns along the top side 5*c* and the bottom side 5*d* is equally changed. This is due to less generation of eddy current because of a low magnetic flux density passing through an outer region of the antenna coil 5. In other words, it can be seen from this fact that a configuration in which only the line width of the innermost antenna pattern is small (1 mm or less) also exerts the effect.

Figure 9:
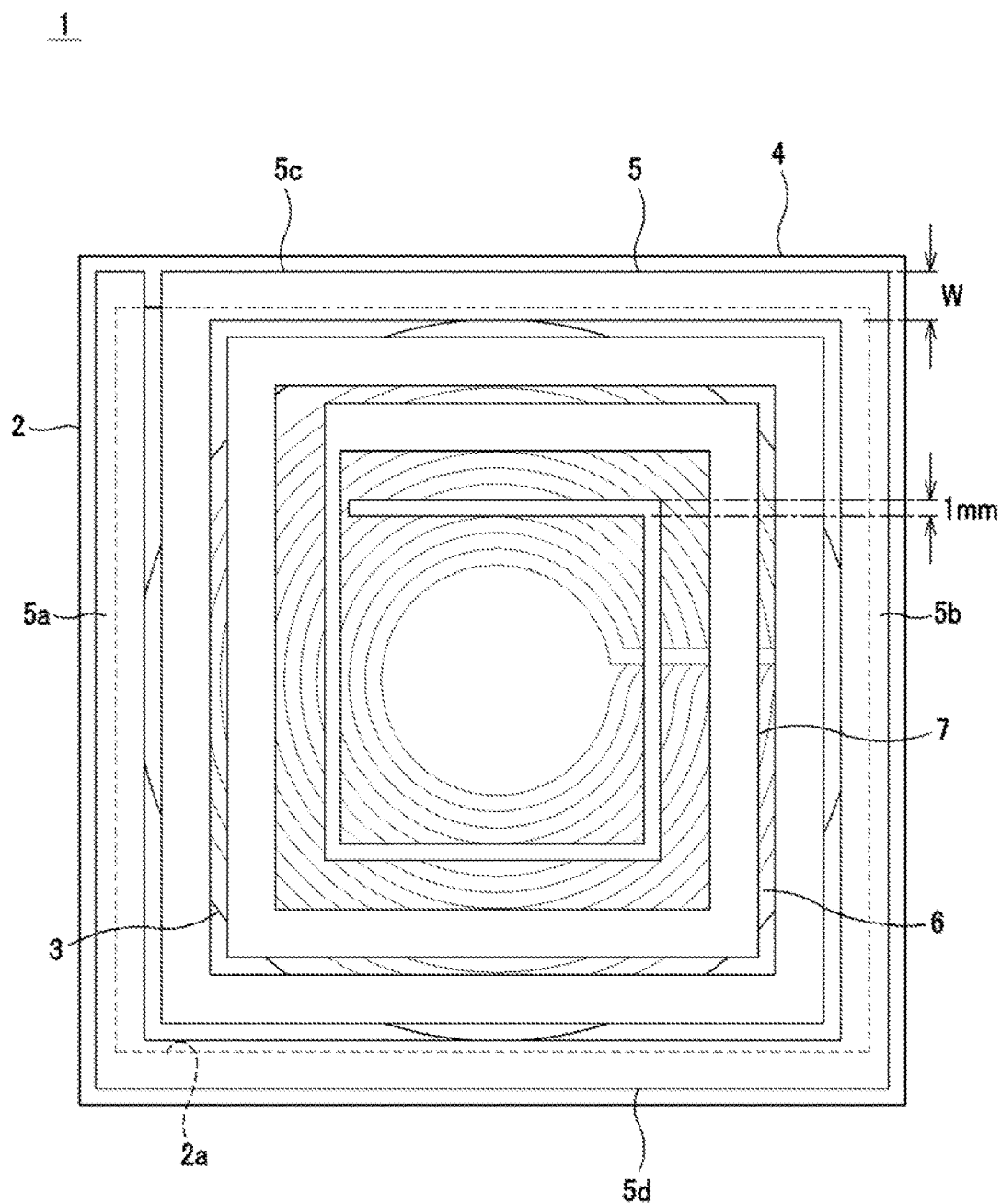
FIG. 9 is a plan view showing a multi-coil module in which the width of the innermost antenna pattern is fixed at 1 mm, while the widths of the outer antenna patterns are equally variable.
Figure 9:
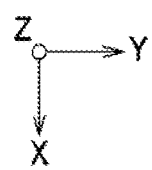
Figure 10:
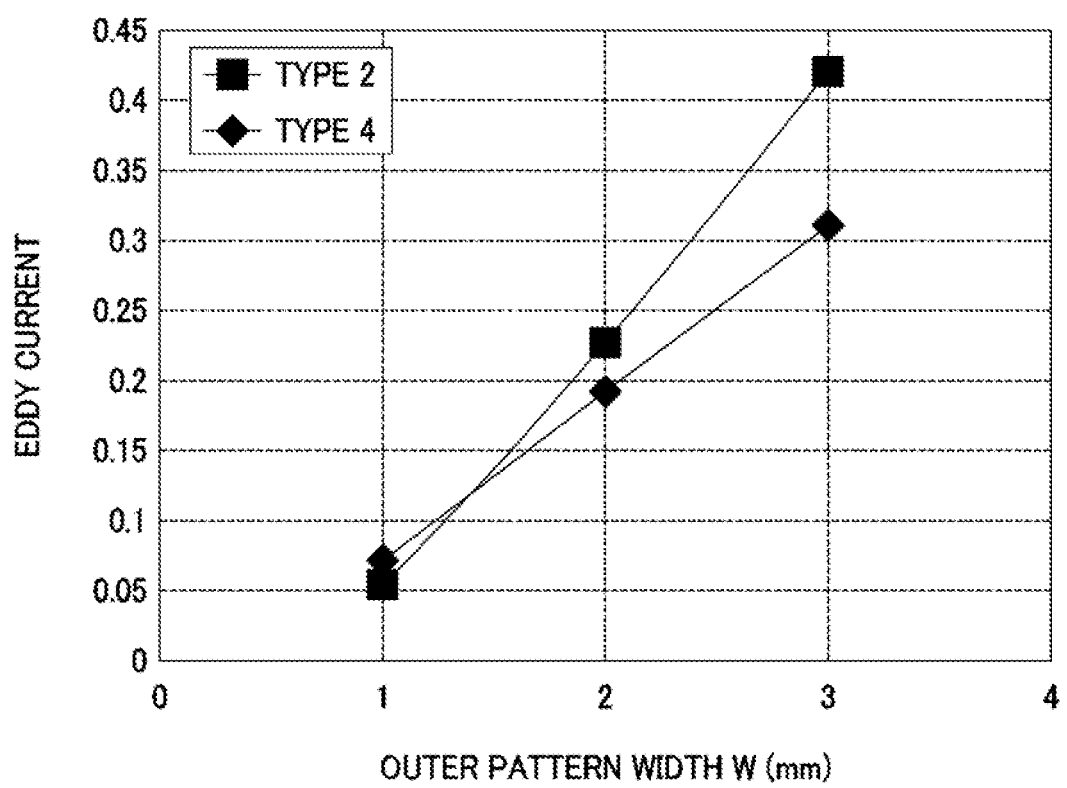
FIG. 10 is a graph showing a relationship between an eddy current and a pattern width of both an antenna module in which the width of the innermost antenna pattern is fixed at 1 mm, while the widths of the outer antenna patterns are equally variable, and an antenna module in which the pattern width is equally variable over the whole length.

Moreover, type 4 has been prepared as shown in FIG. 9. In type 4, the line width of the innermost antenna pattern overlaid with the non-contact charging coil 7 is fixed at 1 mm, and the outer antenna patterns are formed in the same line width over the whole length. Eddy current is investigated into this type 4 and type 2 while the line width of the outer antenna patterns is changed. In type 2, the antenna patterns are formed with the same line width over the whole length. As shown in FIG. 10, type 4 exerts an equivalent effect in reduction in an eddy current, relative to type 2, in which the antenna patterns are formed with the same line width over the whole length. This is due to less generation of eddy current because of a low magnetic flux density in an outer region of the antenna coil 5. This result also shows that taking a configuration in which only the line width of the innermost antenna pattern is small (1 mm or less) also exerts the effect.

[Slit]

Figure 11:
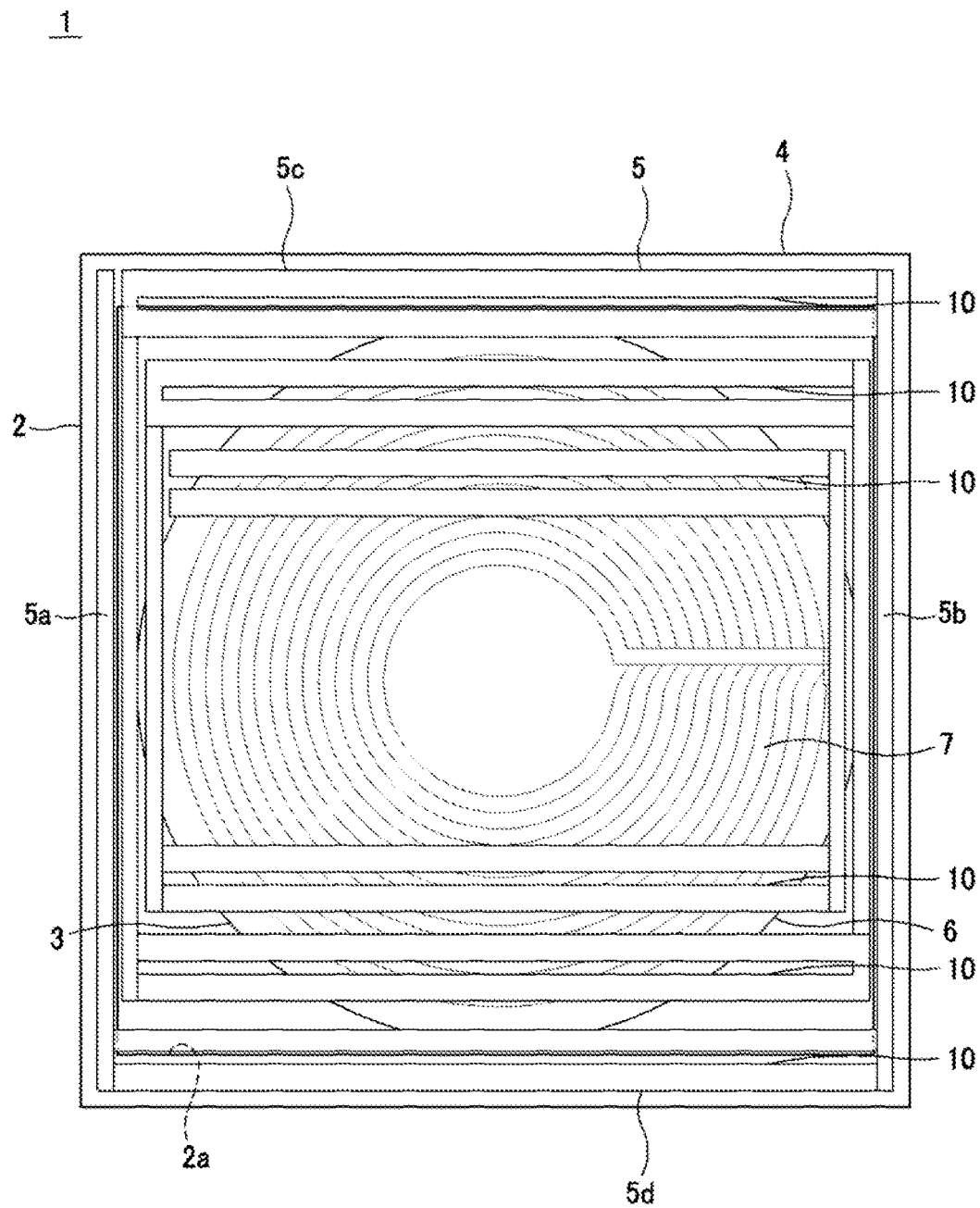
FIG. 11 is a plan view showing a multi-coil module in which a slit is formed in an antenna pattern of a side of the antenna coil overlaid with the non-contact charging coil.

As shown in FIG. 11, the antenna coil 5 may have a slit 10 formed in a longitudinal direction of an antenna pattern along the top side 5*c* and the bottom side 5*d*. As with the case where the line width itself is narrowed, forming a slit 10 also substantially narrows the line width of an antenna pattern in a slit 10 formation region, and suppresses the generation of eddy current. Thus, it is preferable for the antenna pattern to have a pattern width of 1 mm or less separated by the slit 10.

Figure 12:
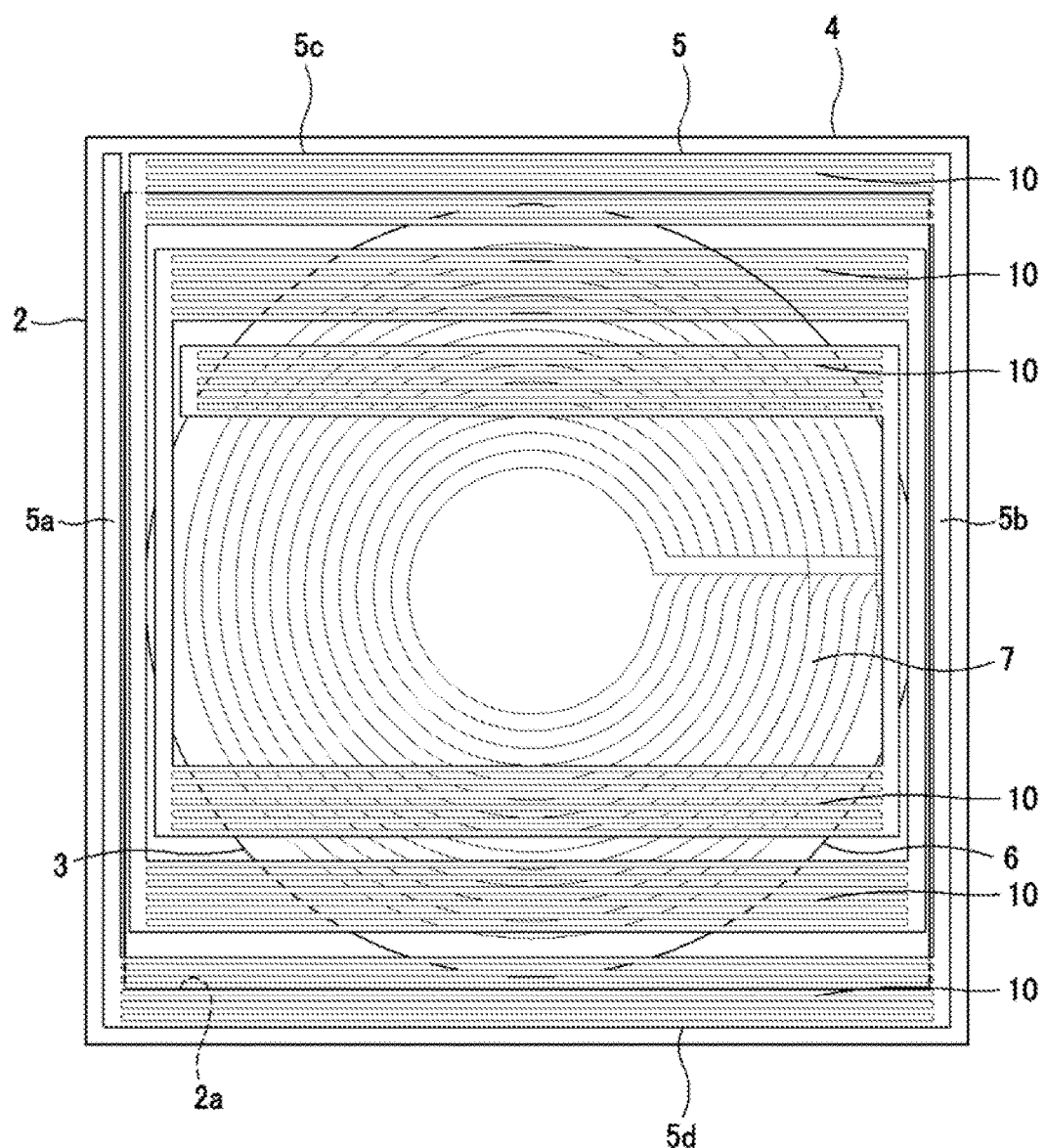
FIG. 12 is a plan view showing a multi-coil module in which a plurality of slits are formed.

The slit 10 may be formed such that only a single slit is formed in one antenna pattern as shown in FIG. 11, or such that a plurality of slots are formed in one antenna pattern as shown in FIG. 12. Moreover, although the slit 10 may be formed in all the antenna patterns along the top side 5*c* and the bottom side 5*d*, the formation of the slit 10 in only the innermost antenna pattern exerts an equivalent effect.

Furthermore, the slit 10 may be formed in the same width in all the antenna patterns along the other pair of sides 5*c* and 5*d* of the antenna coil 5, or may be formed in a width that gradually grows in a direction from the innermost to the outermost.

Figure 13:
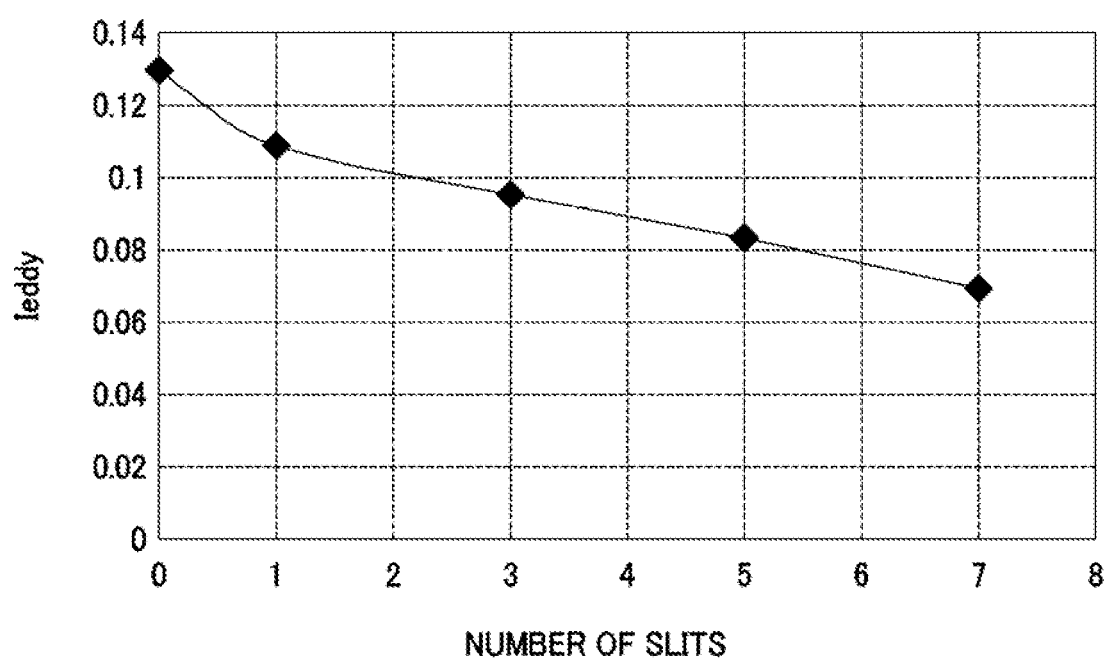
FIG. 13 is a graph showing a relationship between the number of slits and an eddy current.

FIG. 13 is a graph showing a profile of the generation of eddy current when the number of slits 10 formed in one antenna pattern along the top side 5*c* and the bottom side 5*d* is changed in a multi-coil module 1 in which the line width of an antenna pattern along the top side 5*c* and the bottom side 5*d* of the antenna coil 5 is made wider than the line width of an antenna pattern along the left side 5*a* and the right side 5*b*, and the pitch between patterns are also made greater.

The specific conditions were obtained as follows: a magnetic field was generated in the transmission coil at 120 kHz, the eddy current density generated at that time in the antenna coil 5 was calculated, and the absolute value of that value was integrated by the volume of the coil. This value is taken as I eddy. A large value thereof results in a large amount of heat in the coil. It can be seen from FIG. 13 that the formation of the slit 10 suppresses the generation of eddy current, and an increase in the number of the slits 10 enhances the eddy current suppression effect.

Figure 14:
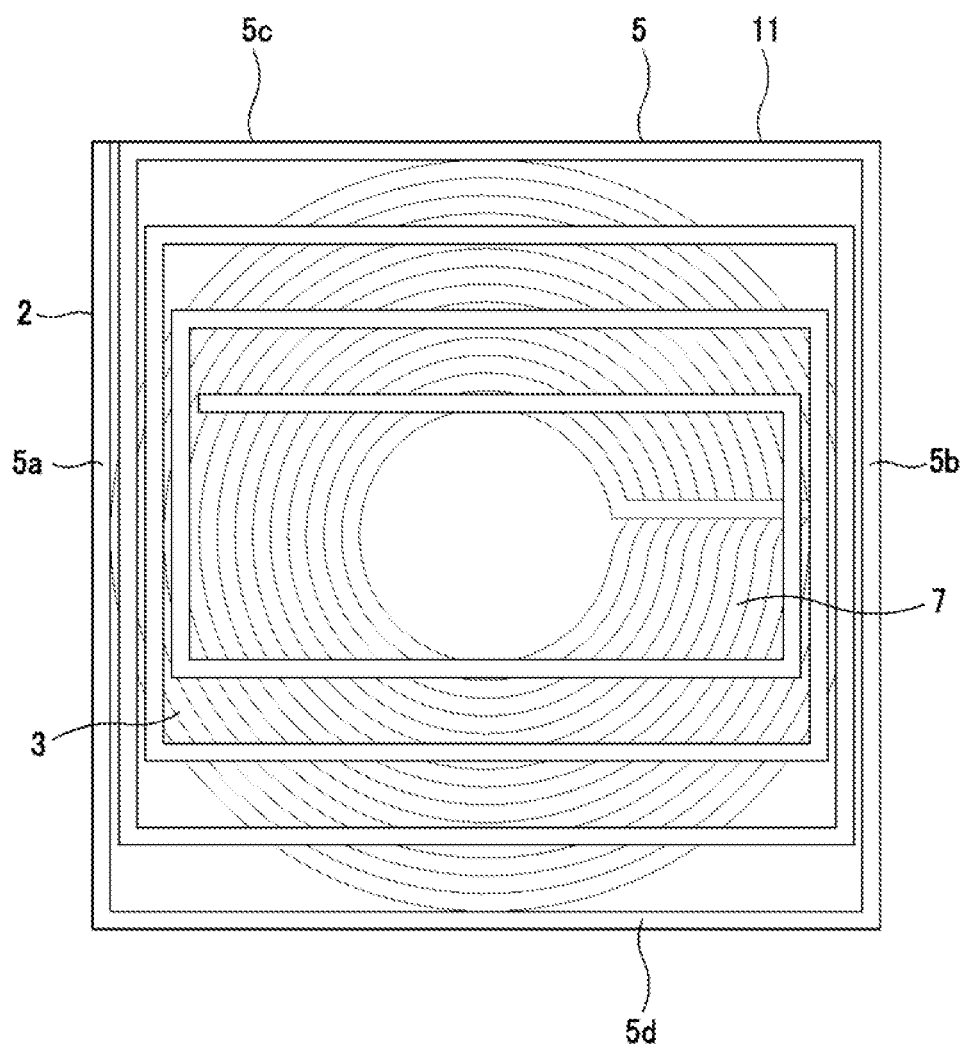
FIG. 14 is a plan view showing a multi-coil module having a magnetic sheet, an antenna coil, and a non-contact charging coil, all of which have the same diameter.
Figure 14:
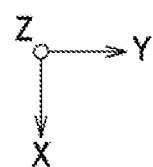

As shown in FIG. 14, the multi-coil module 1 may include a single magnetic sheet 11, an antenna coil 5 overlaid with this magnetic sheet 11, and a non-contact charging coil 7. The magnetic sheet 11 and the antenna coil 5 are formed into substantially the same shape. The non-contact charging coil 7 is formed to have almost the same diameter so as to have internal contact with the outer peripheries of the antenna coil 5 and of the magnetic sheet 11.

The magnetic sheet 11 introduces a magnetic field to both the antenna coil 5 and the non-contact charging coil 7. The configuration of the magnetic sheet 11 is similar to those of the first magnetic sheet 4 and of the second magnetic sheet 6 described above. Also, even in the configuration shown in FIG. 14, the antenna coil 5 is configured such that the line width W of the innermost antenna pattern overlaid with the non-contact charging coil 7 is less than or equal to the line width of an antenna pattern located outside of the innermost antenna pattern. More specifically, the antenna coil 5 is configured such that the line width W of the innermost antenna pattern is 1 mm or less.

Allowing the antenna coil 5 and the non-contact charging coil 7 to have the same diameter, and to share the magnetic sheet 11 therebetween, the configuration shown in FIG. 14 can reduce the area occupied by the multi-coil module 1. The configuration shown in FIG. 14 also can suppress the generation of eddy current in the innermost antenna pattern overlaid with the non-contact charging coil 7 when the non-contact charging coil 7 is subjected to magnetic flux.

[Non-Contact Charging Module]

The non-contact charging module 3 includes a second magnetic sheet 6 formed in the shape of a sheet made of a magnetic material different from that of the first magnetic sheet 4, and a non-contact charging coil 7 having a spiral coil shape, provided on the second magnetic sheet 6, and wound in a planar shape.

The second magnetic sheet 6 is sized to be accommodated into the opening 2a of the antenna coil module 2. As with the first magnetic sheet 4 described above, the second magnetic sheet 6 is a sintered body formed in the shape of a sheet made of magnetic particles, and, for example, MnZn-based ferrite can be preferably used. Alternatively, the second magnetic sheet 6 may be made of NiZn-based ferrite. This second magnetic sheet 6 can be manufactured in a similar manner to the first magnetic sheet 4.

The second magnetic sheet 6 may also be formed into a sheet form that contains magnetic particles of soft magnetic powder, and a resin as a bonding agent, similarly to the first magnetic sheet 4. In addition, the magnetic particles and the bonding agent of the second magnetic sheet 6 may be formed of the materials described above that can be used for those of the first magnetic sheet 4.

As with the first magnetic sheet 4, the second magnetic sheet 6 is not necessarily limited to one made of a single magnetic material, but may be made of a mixture of two or more magnetic materials, or may be a stack of multiple layers. In addition, the second magnetic sheet 6 may be made of the essentially same magnetic material, may be made of a mixture of magnetic particles having a selected plurality of particle sizes and/or shapes, or may be a stack of multiple layers.

The non-contact charging coil 7 is subjected to the magnetic field transmitted from the transmission coil, and is inductively coupled to the transmission r coil, thereby supplies a charging current to the battery of the mobile device in which s the multi-coil module 1 is incorporated. The non-contact charging coil 7 is made, for example, of a spirally-wound conductor wire.

The conductor wire that forms the non-contact charging coil 7 is preferably a single wire that is made of Cu, having a diameter in a range from 0.20 to 0.45 mm or of an alloy whose main ingredients are made of Cu, when the non-contact charging module 3 is used, for example, at a frequency about 120 kHz, as the secondary charging coil for non-contact charging having a charge power capacity of about 5 W. Alternatively, to reduce skin effect, the conductor wire may be parallel wires, or a braided wire, made of a plurality of thin wires thinner than the single wire described above, or may be of an α-winding wire having one or two layers using a low-thickness rectangular or flat wire. Still alternatively, the non-contact charging coil 7 may be made using Cu foil, or the like, patterned on a substrate, such as a flexible substrate, depending on the current capacity.

[Non-Contact Charging System]

Figure 15:
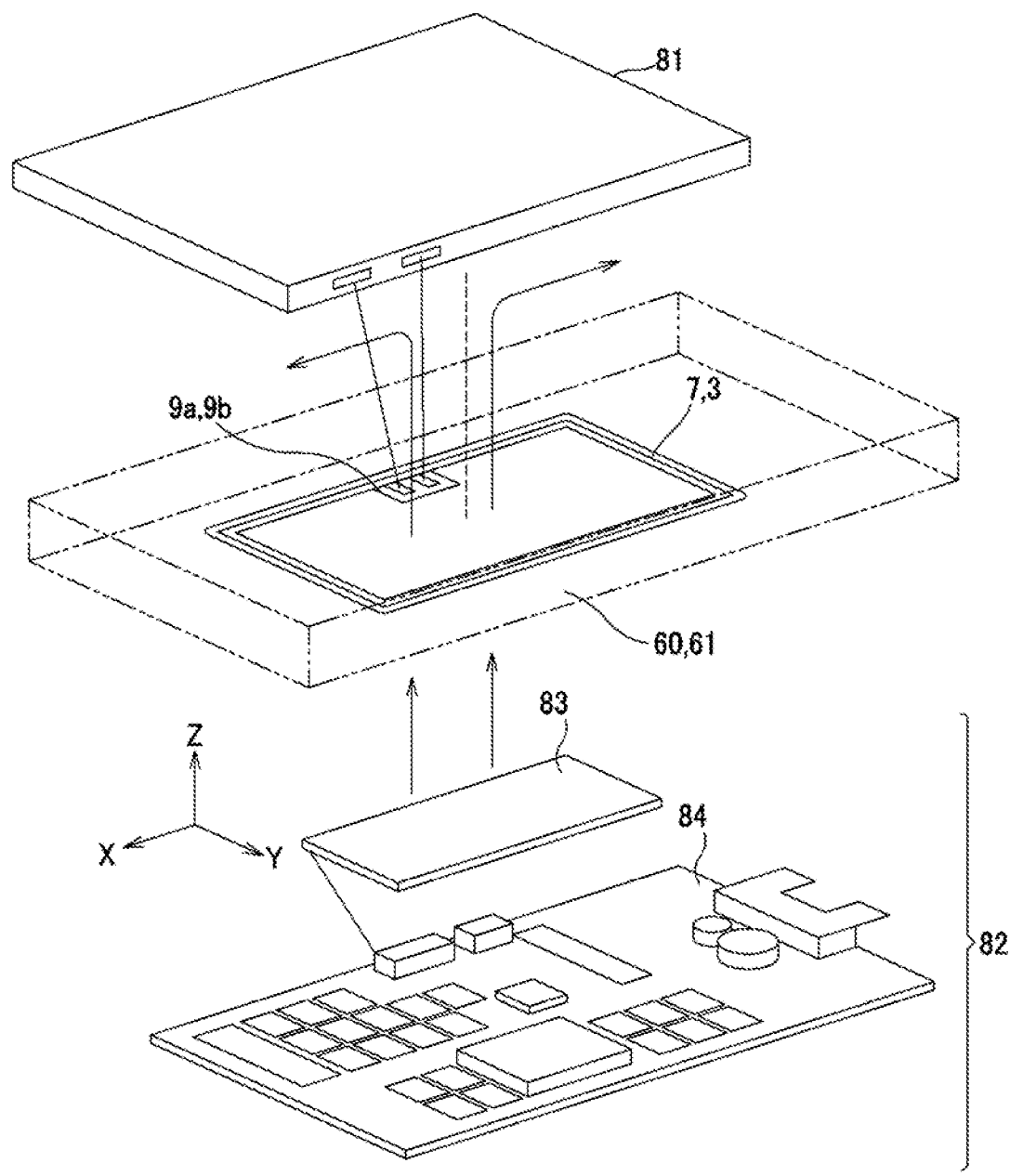
FIG. 15 is a conceptual diagram showing a non-contact charging system.

A non-contact charging function of the non-contact charging coil 7 will next be described. As shown in FIG. 15 for example, the non-contact charging coil 7 is used, for example, in a non-contact charging system 80 compliant with the Qi standard.

The non-contact charging system 80 is for charging, by a charger 82, the battery pack 81 connected to the non-contact charging coil 7 of the non-contact charging module 3. It is assumed here that the non-contact charging coil 7 of the non-contact charging module 3 and the transmission coil 83 of the charger 82 are arranged to face each other in an x-y plane of a three-dimensional orthogonal coordinate system xyz as with the positional relationship described above between the antenna coil 5 and the reader/writer 71.

The charger 82 functions as power transmission means that transmits a magnetic field in a z-axis direction toward the non-contact charging coil 7 of the non-contact charging module 3 facing the charger 82 in the x-y plane. More specifically, the charger 82 includes the transmission coil 83 that transmits a magnetic field toward the non-contact charging coil 7, and a power transmission control substrate 84 that controls power supply to the non-contact charging coil 7 inductively coupled via the transmission coil 83.

That is, the charger 82 is provided with the power transmission control substrate 84 electrically connected to the transmission coil 83. This power transmission control substrate 84 includes a control circuit having one or more electronic components such as integrated circuit chips. This control circuit transfers a charging current to the non-contact charging coil 7 inductively coupled to the transmission coil 83. More specifically, the power transmission control substrate 84 drives the transmission coil 83 by a power transmission current of a predetermined frequency, e.g., a relatively low frequency of 110 kHz.

The non-contact charging module 3 is embedded in the housing 61 of the mobile phone 60 as described above, and the non-contact charging coil 7 receives the magnetic field transmitted from the transmission r coil 83, and is inductively coupled to the transmission coil 83, thereby supplies the received current to the battery pack 81 incorporated in the mobile phone 60.

Upon receiving the magnetic field transmitted from the charger 82, the non-contact charging coil 7 is magnetically coupled to charger 82 via inductive coupling, receives a modulated electromagnetic wave, and then supplies the charging current to the battery pack 81 through terminal portions 9a and 9b.

The battery pack 81 applies, to a battery cell in the battery pack 81, a charging voltage dependent on the charging current flowing through the non-contact charging coil 7.

Since the multi-coil module 1 described above includes both the antenna coil 5 that implements a near field communication function and the non-contact charging coil 7 that implements a non-contact charging function, a near field communication function and a non-contact charging function can both be implemented while achieving the downsizing of the housing 61 when incorporated in the mobile phone 60 that is an electronic device.

In this instance, according to the multi-coil module 1, since the multi-coil module 1 is configured such that the line width W of the innermost antenna pattern overlaid with the non-contact charging coil 7 of the antenna coil 5 is 1 mm or less, when the non-contact charging coil 7 is subjected to the magnetic flux, the generation of eddy current can be suppressed in the innermost antenna pattern overlaid with the non-contact charging coil 7. This reduces a loss due to the generation of eddy current, and also prevents a situation in which efficient charging cannot be achieved caused by reflection of the magnetic flux due to an eddy current in the innermost antenna pattern t, and a situation in which thermal shock is applied to neighboring components caused by heat generation in the innermost antenna pattern t due to the generation of eddy current.

REFERENCE SYMBOLS

1 Multi-coil module
2 Antenna module
2a Opening
3 Non-contact charging module
4 First magnetic sheet
5 Antenna coil
6 Second magnetic sheet
7 Non-contact charging coil
8 Terminal portion
9 Terminal portion
10 Slit
20 Compact antenna coil
60 Mobile phone
61 Housing
70 Wireless communication system
71 Reader/writer
72 Antenna
73 Memory module
74 Control board
80 Non-contact charging system
81 Battery pack
  Charger
83 Transmission coil
84 Power transmission control board

The invention claimed is:

1. A multi-coil module comprising:
a first coil module having a first magnetic sheet, and a first loop coil provided on the first magnetic sheet and wound in a planar shape; and
a second coil module having a second magnetic sheet, and a second loop coil provided on the second magnetic sheet and wound in a planar shape,
wherein the first coil module and the second coil module are stacked on each other, and at least an innermost coil pattern of the first loop coil and the second loop coil are overlaid with each other,
a line width of the innermost coil pattern of the first loop coil overlaid with the second loop coil is 1 mm or less, and
the first loop coil is configured such that a pitch between outer coil patterns is smaller than a pitch between inner coil patterns.

2. A multi-coil module comprising:
a first coil module having a first magnetic sheet, and a first loop coil provided on the first magnetic sheet and wound in a planar shape; and
a second coil module having a second magnetic sheet, and a second loop coil provided on the second magnetic sheet and wound in a planar shape,
wherein the first coil module and the second coil module are stacked on each other, and at least an innermost coil pattern of the first loop coil and the second loop coil are overlaid with each other,
a line width of the innermost coil pattern of the first loop coil overlaid with the second loop coil is less than a line width of a coil pattern located outside of the innermost coil pattern, and
the first loop coil is configured such that a pitch between outer coil patterns is smaller than a pitch between inner coil patterns.

3. The multi-coil module according to claim 1, wherein the first loop coil is configured such that a line width of an outer coil pattern other than the innermost coil pattern is wider than the line width of the innermost coil pattern.

4. The multi-coil module according to claim 1, wherein the first loop coil is formed to have the same width over the whole length.

5. The multi-coil module according to claim 1, wherein the first loop coil has a slit formed in the coil pattern overlaid with the second loop coil, along that coil pattern.

6. The multi-coil module according to claim 1, wherein the first loop coil is configured such that a coil pattern not overlaid with the second loop coil and a coil pattern overlaid with the second loop coil have different line widths and/or different pitches between coil patterns.

7. The multi-coil module according to claim 1, wherein the second coil module is provided in an opening formed in the first magnetic sheet.

8. An electronic device having a multi-coil module incorporated in device housing,
wherein the multi-coil module includes:
  a first coil module having a first magnetic sheet, and a first loop coil provided on the first magnetic sheet and wound in a planar shape; and
  a second coil module having a second magnetic sheet, and a second loop coil provided on the second magnetic sheet and wound in a planar shape,
  the first coil module and the second coil module are stacked on each other, and at least an innermost coil pattern of the first loop coil and the second loop coil are overlaid with each other,
  a line width of the innermost coil pattern of the first loop coil overlaid with the second loop coil is 1 mm or less, and
  the first loop coil is configured such that a pitch between outer coil patterns is smaller than a pitch between inner coil patterns.

9. An electronic device having a multi-coil module incorporated in device housing,
wherein the multi-coil module includes:
  a first coil module having a first magnetic sheet, and a first loop coil provided on the first magnetic sheet and wound in a planar shape; and
  a second coil module having a second magnetic sheet, and a second loop coil provided on the second magnetic sheet and wound in a planar shape, the first coil module and the second coil module are stacked on each other, and at least an innermost coil pattern of the first loop coil and the second loop coil are overlaid with each other, a line width of the innermost coil pattern of the first loop coil overlaid with the second loop coil is less than a line width of a coil pattern located outside of the innermost coil pattern, and the first loop coil is configured such that a pitch between outer coil patterns is smaller than a pitch between inner coil patterns.

\* \* \* \* \*